Aug. 28, 1928.

R. T. KINTZING 1,682,381

MOTOR CONTROL SYSTEM

Filed Nov. 21, 1925    2 Sheets-Sheet 1

WITNESSES:
E.A. McCloskey
JE Hardy

INVENTOR
Reese T. Kintzing.
BY
Wesley G. Carr
ATTORNEY

Aug. 28, 1928.  
R. T. KINTZING  
MOTOR CONTROL SYSTEM  
Filed Nov. 21, 1925

1,682,381

2 Sheets-Sheet 2

WITNESSES:

INVENTOR  
Reese T. Kintzing.  
BY  
ATTORNEY

Patented Aug. 28, 1928.

1,682,381

UNITED STATES PATENT OFFICE.

REESE T. KINTZING, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed November 21, 1925. Serial No. 70,482.

My invention relates to motor-control systems and more particularly to means for varying the starting resistance in a motor-armature circuit that is connected to a variable-voltage supply circuit.

In certain industrial motor applications such as sectional motor drives for paper-making machines, a number of direct-current motors are operated in parallel relation, having their armature windings connected to variable-voltage supply conductors. The voltage of the supply conductors is varied to control the speed of the group of motors. It happens, therefore, that under different operating conditions of the motors, the voltage available for starting an individual motor will vary. The starting resistance provided for each motor will ordinarily be that value required under maximum voltage conditions of the variable-voltage supply source. It becomes necessary, therefore, to change the effective value of the corresponding starting resistance in order to obtain approximately the same starting current at reduced supply-circuit voltages as that obtained at the maximum operating voltage.

One object of my invention is to provide means for automatically varying the value of starting resistance available for starting a motor in accordance with variations in the voltage of the source of supply.

Figure 1:
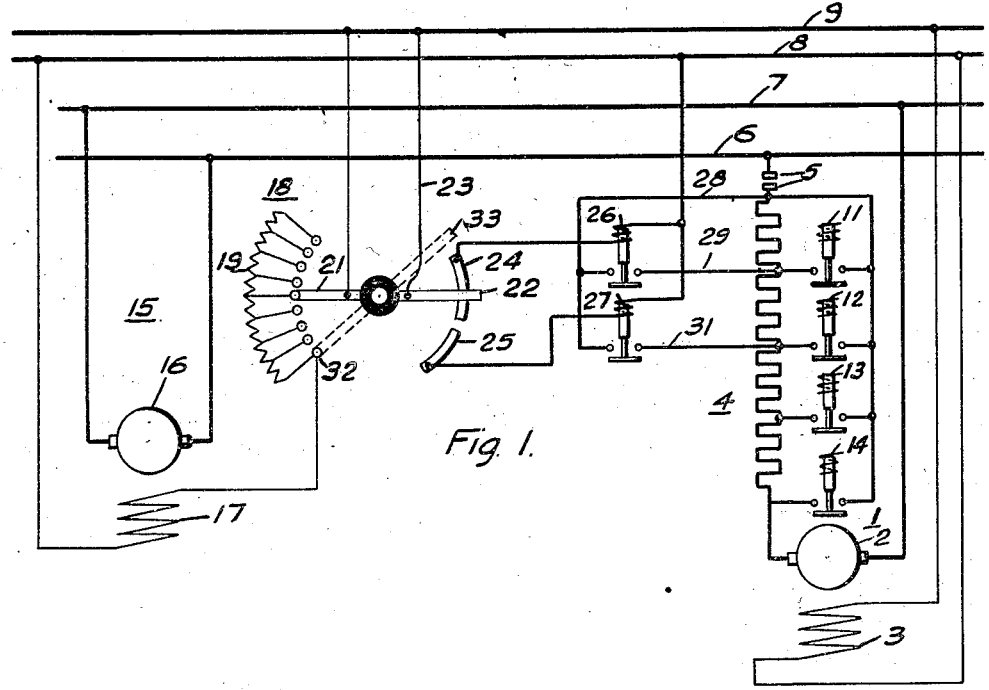
Figure 2:
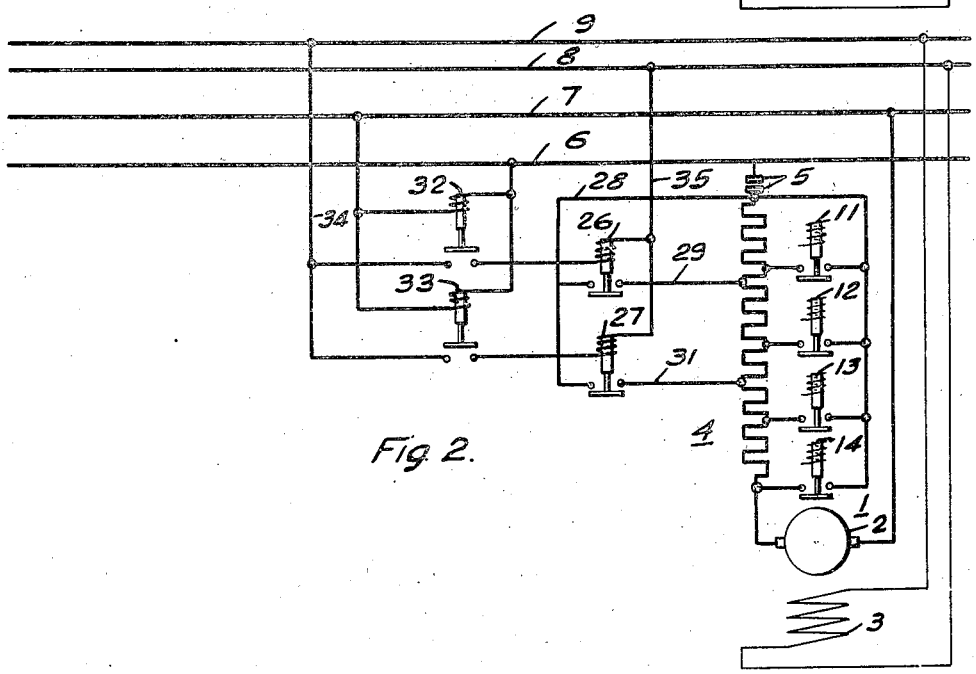
Figure 3:
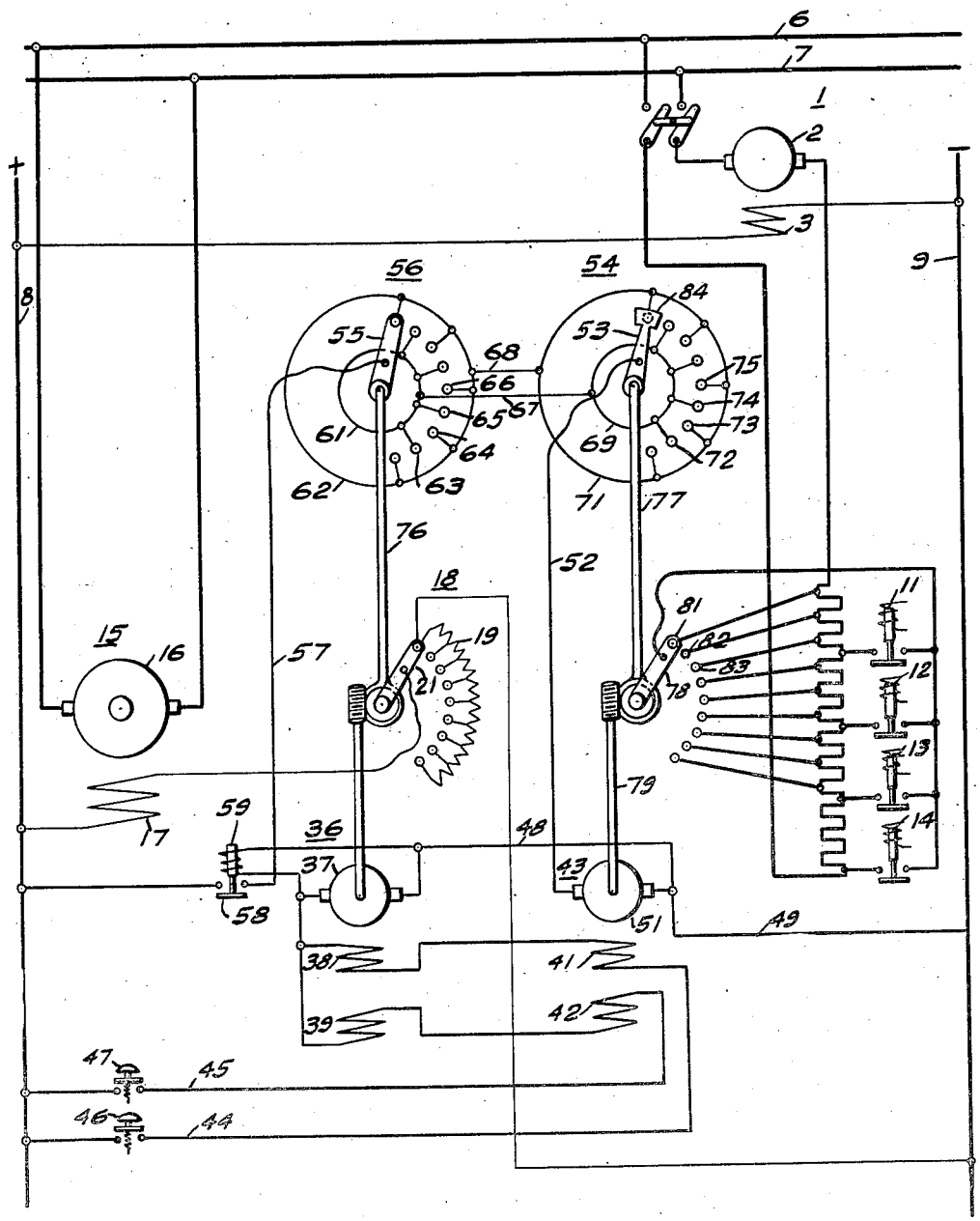

My invention will be better understood by reference to the accompanying drawing, in which Figure 1 is a diagrammatic view of circuits and apparatus used to illustrate one modification of my invention, wherein portions of a starting resistor are short-circuited in accordance with the operation of the generator field-rheostat, Fig. 2 illustrates a modified form of the invention in which portions of the starting resistor are short-circuited by the operation of low-voltage relays that are connected to the variable-voltage supply conductors, and Fig. 3 is a diagrammatic view of a third form of the invention, wherein a pilot motor is actuated to govern the value of starting resistance in accordance with the operation of the generator field rheostat.

Referring to Fig. 1 of the drawing, a direct-current motor 1 is illustrated as having an armature winding 2 and a field winding 3. The armature winding is connected through a starting resistor 4 and a suitable line switch 5 to variable-voltage supply conductors 6, 7; while the field winding 3 is connected to constant-voltage supply conductors 8, 9. A plurality of magnetically-operated accelerating switches 11, 12, 13 and 14 are provided for successively short-circuiting portions of the starting resistor 4 during the acceleration of the motor, in a well-known manner.

A direct-current generator 15 is provided, having an armature winding 16 and a field winding 17. The armature winding 16 is connected to the variable-voltage supply conductors 6, 7 and the field winding 17 is connected through a rheostat 18 to the constant-potential supply conductors 8, 9. The rheostat 18 comprises a resistor element 19 and a cooperating contact-making arm 21. An electrically independent contact-making arm 22 is adapted to be actuated in accordance with the movement of the arm 21, and is connected by means of conductor 23 to one of the constant-potential supply conductors, 9. The arm 22 is adapted to engage contact segments 24 and 25, which are respectively connected through windings of relays 26 and 27 to the constant-potential supply conductor 8. Upon the energization of the operating coil of the switch 26, a circuit is completed through the switch and conductors 28 and 29, in shunt relation to a portion of resistor 4; and upon the energization of the coil of the switch 27, a circuit is completed throughout the switch and conductors 28 and 31, in shunt relation to a larger portion of the resistor 4.

The control of the switches 26 and 27 is as follows: When the rheostat arm 21 is in its extreme lower position, in engagement with contact button 32, corresponding to full excitation of the generator 15, or to maximum voltage upon the supply-circuit conductors 6, 7, the contact arm 22 will be in the dotted line position 33, out of engagement with the contact segments 24 and 25. As the rheostat contact arm 21 is moved upwardly, inserting a portion of the resistor 19 in circuit with the field winding 17 and correspondingly reducing the voltage of the generator 15, the voltage available for starting the motor 1 from the supply conductors 6, 7 will be correspondingly lowered, thereby requiring a smaller resistance value in circuit with the motor armature for starting.

If the arm 21 is moved sufficiently, the contact arm 22 will engage the contact segment 24, completing a circuit across supply conductors 8 and 9 through the winding of the switch 26, causing it to operate to complete a circuit through conductors 28 and 29 to shunt a portion of the resistor 4, thereby permitting a larger starting current to flow through the motor armature 2. If the rheostat arm 21 is moved further upwardly, inserting a greater portion of the resistor 19 in series relation with the field winding 17, a point will be reached where the contact arm 22 will engage the conducting segment 25, causing the switch 27 to be operated to close a circuit through conductors 28 and 31, thus further reducing the portion of the resistor 4 that is in circuit with the motor armature 2 upon starting.

While only two magnetically operated switches 26 and 27 are shown, it is apparent that any number of switches, with a corresponding number of contact segments, such as 24 and 25, may be used to cut out portions of the resistor 4 in steps of any desired value.

Referring to Fig. 2 of the drawing, the arrangement of the motor circuits is similar to that illustrated in Fig. 1 with the exception that the switches 26 and 27 are operated by means of low-voltage relays 32 and 33, which have their actuating coils connected across supply conductors 6 and 7, instead of the corresponding circuits being made through contact segments of the generator field-rheostat. If the voltage of the supply conductors 6, 7 drops to a predetermined value, the low-voltage relay 32 will drop, closing a circuit across supply conductors 8 and 9, through conductors 34 and 35 and the operating winding of switch 26, thereby causing the switch to close. If the voltage of the supply conductors 6, 7 further drops to another predetermined value, the low-voltage relay 33 will close, completing a circuit through the operating coil of switch 27 and causing a short-circuit of a greater portion of the starting resistor 4 through conductors 28 and 31. It is apparent that any number of low-voltage relays, corresponding to relays 32 and 33 may be used for operating a like number of switches, such as 26 and 27, the relays being adjusted to operate at predetermined voltage values across the supply conductors 6, 7, to effect short-circuits of corresponding portions of the resistor 4.

Referring to Fig. 3 of the drawing, the armature 2 of motor 1 is connected to the variable-voltage supply conductors 6, 7 as in the previous figures, and the motor field winding 3 is connected across the constant-potential supply conductors 8, 9. The generator 15 is connected to supply voltage to the conductors 6, 7 and is provided with a field winding 17 that is connected in circuit with rheostat 18 across constant-potential supply conductors 8, 9. The rheostat 18 is mechanically connected to a pilot motor 36 that is provided with an armature winding 37 and split field windings 38 and 39, which are respectively connected in series circuit relation with split field windings 41 and 42 of a second pilot motor 43, and by means of conductors 44 and 45 and push-button switches 46 and 47, respectively, to one of the constant-potential supply conductors, 8. The circuit of the pilot motor 36 is completed through conductors 48 and 49 to the constant-potential supply conductor 9.

A second pilot motor 43 is provided with an armature winding 51 having one terminal connected by means of the conductor 49 to the supply conductor 9 and having the other terminal connected by means of a conductor 52 to a contact arm 53 of a face-plate contactor 54. The contact arm 53 is adapted to slide over a series of contact buttons which are connected alternately to similar contact buttons over which a contact 55 of a face-plate contactor 56 slides. The contactor 56 is connected, as by shaft 76, to move with rheostat arm 21. A circuit through the pilot motor 43 may thus be completed by means of conductor 57 and contact member 58 of a relay 59 to the supply conductor 8.

The face plate contactor 56 is provided with a pair of conductors 61 and 62, which are respectively connected to alternate contact buttons such as 63, 64, 65 and 66 that are adapted to be engaged by the contact arm 55. The conductors 61 and 62 are connected by means of conductors 67 and 68, repectively, to similar conductors 69 and 71 of the face-plate contactor 54. The conductors 69 and 71 are similarly connected to alternate buttons, such as 72, 73, 74 and 75 of the face-plate contactor 54.

As mentioned above, the contact arm 55 of the face-plate contactor 56 is connected by means of a shaft 76 to the contact arm 21 of the rheostat 18; while the contact arm 53 of the face-plate contactor 54 is connected by means of a shaft 77 to a contact arm 78 that is operated by means of a shaft 79, in accordance with the operation of the pilot motor 43. The contact arm 78 engages successive contact buttons such as 81, 82, 83 for varying the proportion of the resistor 4 that is in circuit with the armature of the motor 1. It will be noted that the contact-making arm 53 is provided with a portion 84 of sufficient width to engage two consecutive contact buttons, so that a circuit through the contact arm 53 may be completed at all times through one of the conductors 69 or 71.

The operation of the form of invention illustrated in Fig. 3 is as follows: The illustrated position of the rheostat arm 21 corresponds to a full field excitation of the generator 15 and, consequently, to maximum voltage on the supply conductors 6, 7. When it is desired to vary the voltage of the supply conductors 6, 7, the proper push-button 46 or 47 is actuated to complete a circuit through the motor 36, energizing one of the field windings 38 or 39, and the corresponding field winding 41 or 42 of the motor 43, so that the motor 43 will be so energized as to operate in the same direction as the motor 36.

As the armature of the motor 36 is energized, the counter-electromotive force relay 59 is also energized, closing the circuit through contact member 58 and contact arm 55 of the face-plate contactor 56. The contact arm 55 will be actuated by the motor 36 so as to move in accordance with the arm 21 of the generator field-rheostat. As the contact arm 55 advances, it will alternately engage a contact button that it connected to the conductor 61 and a contact button that is connected to the conductor 62, thereby alternately connecting the conductors 69 and 71 of the face-plate contactor 54 to the supply conductor 8.

Since the contact arm 53 is provided with a contact portion 84 of sufficient width to engage adjacent contact buttons, a circuit is insured through conductors 52 and 49, and the pilot motor armature 51, causing the pilot motor 43 to be operated so as to move the contact arm 78 to vary the effective value of the resistor 4 and to correspondingly move the contact arm 53 until the conducting portion 84 of the contact arm 53 disengages the energized contact button, as more fully described below, thus interrupting the circuit through the armature of the pilot motor 43.

The relay 59 insures against a circuit being completed through the armature of the pilot motor 43 when the rheostat motor 36 is not in operation. The series connections of the field windings 38 and 41, and of the field windings 39 and 42, of the pilot motors 36 and 43, respectively, insures that the motor 43 will be actuated in the same direction as the pilot motor 36. So long as the motor 36 is operated in a given direction, causing the contact arm 55 to successively engage contact buttons of the face-plate contactor 56, a circuit will be completed through the face-plate contactors 56 and 54 and the armature of the pilot motor 43.

As the rheostat motor 36 is deenergized, preventing the further movement of the contact arm 55 and consequently the further energization of the successive contact buttons of the contactor 54, the next succeeding contact button to be engaged by the contact arm 53 will be deenergized, thereby interrupting the circuit through the armature of the pilot motor 43.

Many modifications may be made in the above-described apparatus and circuits without departing from the spirit of my invention, and I do not wish to be limited other than by the scope of the appended claims.

I claim as my invention:

1. In a motor-control system, a variable-voltage supply circuit, a motor adapted to be connected to said supply circuit, a starting device connected in circuit with said motor, and means for varying the effective value of said device in accordance with the voltage of said supply circuit prior to the connection of the motor thereto.

2. In a motor-control system, a variable-voltage supply circuit, a motor adapted to be connected to said supply circuit, a resistor connected in circuit with said motor, and means for shunting portions of said resistor in accordance with variations in the voltage of said supply circuit prior to the connection of the motor thereto.

3. In a motor-control system, a variable-voltage supply circuit, a motor adapted to be connected to said supply circuit, a resistor connected in circuit with said motor, a generator connected to said supply circuit and provided with a rheostat for varying the voltage thereof, and means actuated in accordance with the operation of said rheostat for varying the effective value of said resistor.

4. In a motor-control system, a variable-voltage supply circuit, a motor adapted to be connected to said supply circuit, a resistor connected in circuit with said motor, a generator connected to said supply circuit and provided with a rheostat for varying the voltage thereof, and means actuated in accordance with the operation of said rheostat for excluding portions of said resistor from said motor circuit.

5. In a motor-control system, a variable voltage supply circuit, a motor adapted to be connected to said supply circuit, a resistor connected in circuit with said motor, a generator connected to said supply circuit and provided with a rheostat for varying the voltage thereof, electromagnetically operated switches for shunting portions of said resistor, and means actuated in accordance with the operation of said rheostat for operating said switches.

6. In a motor-control system, a variable-voltage supply circuit, a motor adapted to be connected to said circuit, a resistor connected in circuit with said motor, a generator connected to said supply circuit and provided with a rheostat for varying the voltage thereof, a pilot motor for operating said rheostat, a face-plate contactor operated by said motor, a second pilot motor for varying the value of said resistor, a face-plate contactor operated by said second motor, and means comprising said face-plate contactors for governing said second-named pilot motor in accordance with the operation of said first-named pilot motor.

In testimony whereof, I have hereunto subscribed my name this 17th day of November, 1925.

REESE T. KINTZING.